United States Patent [19]

Paik

[11] Patent Number: 4,926,477

[45] Date of Patent: May 15, 1990

[54] CABLE TELEVISION DESCRAMBLER

[75] Inventor: Woo H. Paik, San Diego, Calif.

[73] Assignee: General Instrument Corporation, New York, N.Y.

[21] Appl. No.: 206,612

[22] Filed: Jun. 14, 1988

[51] Int. Cl.$^5$ .............................................. H04N 5/04
[52] U.S. Cl. ..................................... 380/15; 358/148; 358/150
[58] Field of Search ..................... 358/150, 148, 149; 380/15

[56] References Cited

U.S. PATENT DOCUMENTS

| | | | |
|---|---|---|---|
| 3,184,537 | 5/1965 | Court et al. | 380/15 |
| 3,530,232 | 9/1970 | Reiter et al. | 380/15 |
| 3,639,686 | 2/1972 | Walker et al. | 178/5.8 R |
| 4,075,660 | 2/1978 | Horowitz | 380/15 |
| 4,222,068 | 9/1980 | Thompson | 380/15 |
| 4,238,766 | 12/1980 | Masuda | 358/86 |
| 4,316,217 | 2/1982 | Rifken | 358/86 |
| 4,335,404 | 6/1982 | Martinson, Jr. | 358/188 |
| 4,389,671 | 6/1983 | Posner et al. | 380/15 |
| 4,496,986 | 1/1985 | Lubchenko et al. | 358/114 |
| 4,518,993 | 5/1985 | Okada et al. | 358/114 |
| 4,530,008 | 7/1985 | McVoy | 358/123 |
| 4,611,242 | 9/1986 | Williams | 358/123 |
| 4,630,133 | 12/1986 | Long | 358/335 |
| 4,656,629 | 4/1987 | Kondoh et al. | 370/85 |
| 4,688,246 | 8/1987 | Eilers et al. | 380/15 |
| 4,712,237 | 12/1987 | Walker | 380/15 |
| 4,716,588 | 12/1987 | Thompson et al. | 380/15 |
| 4,802,214 | 1/1989 | Barany | 380/15 |

Primary Examiner—Stephen C. Buczinski
Assistant Examiner—David Cain
Attorney, Agent, or Firm—Barry R. Lipsitz

[57] ABSTRACT

A descrambler for a scrambled channel having a suppressed horizontal synchronization pulse which scrambled channel is provided in a broadband cable television signal along with nonscrambled channels. A signal splitter receives the broadband CATV signal and provides first and second split outputs. A switch coupled to the second output of the signal splitter passes the horizontal synchronization pulse of the scrambled channel and blocks the video signal of the scrambled channel. The horizontal synchronization pulse passing through the switch is then phase adjusted to synchronize with the horizontal synchronization pulse of the scrambled channel provided at the first output of the signal splitter, and both horizontal synchronization pulses are summed in a combiner along with the video/audio signal provided at the first output of the signal splitter. Consequently, the full synchronization pulse is provided at the output of the combiner to descramble the scrambled channel. No band reject filter is required between the first output of the power splitter and the power combiner so that the nonscrambled channels are unaffected by the descrambler.

14 Claims, 3 Drawing Sheets

4,926,477

CABLE TELEVISION DESCRAMBLER

BACKGROUND OF THE INVENTION

The invention relates generally to cable television descramblers, and deals more particularly with a low cost descrambler system which does not appreciably degrade nonscrambled channels transmitted simultaneously with the scrambled channel.

Heretofore, a broadband cable television (CATV) signal was supplied to a power splitter at the input of a descrambler system. A band reject filter was coupled to one output of the power splitter to reject the scrambled channel. A descrambler was coupled to another output of the power splitter to descramble the scrambled channel. The outputs of the band reject filter and the descrambler were combined and transmitted to a television or other video appliance, which output contained the descrambled channel as well as other nonscrambled channels.

One problem with such a descrambler system is that all the nonscrambled channels must pass through the band reject filter, and this filter degrades to various degrees the nonscrambled channels, especially the channels adjacent to the scrambled channel. Also, the band reject filter is expensive because it is sharp; the filter typically provides 60 decibels of attenuation of the scrambled channel. Moreover, such a system includes up and down converters in the descrambler to convert the frequency of the scrambled channel to the frequency of the bandpass filter.

Accordingly, a general object of the present invention is to provide a low cost descrambler system which does not appreciably interfere with nonscrambled channels yet provides effective descrambling.

A more specific object of the present invention is to provide a descrambler system of the foregoing type which does not require a filter to pass nonscrambled channels, or up and down converters for converting the frequency of the scrambled channel to an unused channel.

Another ancillary object of the present invention is to provide descrambler systems of the foregoing type which can be installed either as off-premise or on-premise devices.

SUMMARY OF THE INVENTION

The invention resides in a television descrambler for a scrambled channel in which the horizontal synchronization pulses are suppressed. A CATV signal containing the scrambled and unscrambled channels is input to a signal splitter having first and second split outputs. A switch is coupled to the second output of the splitter and is activated to pass a horizontal synchronization pulse of the scrambled channel while blocking a video signal of the scrambled channel. The horizontal synchronization pulse passed through the switch is synchronized with the horizontal synchronization pulse in the scrambled channel passed to the first output of the signal splitter to compensate for phase shifts or other delays caused by processing of the scrambled channel. The horizontal synchronization pulse passed through the switch means is combined in a combiner with the first output from the signal splitter such that the power of the resultant horizontal synchronization pulse relative to the video signal is approximately equal to an unsuppressed/descrambled channel for output to a video appliance.

According to one feature of the invention, a bandpass filter tuned approximately to the scrambled channel is interposed between the second output of the signal splitter and the switch.

According to another feature of the invention, the first output of the power splitter is connected directly to the combiner.

BRIEF DESCRIPTION OF THE FIGURES

FIG. 1 illustrates in solid line circuitry to descramble one channel, and in broken line, similar optional circuitry to descramble additional channels.

DETAILED DESCRIPTION OF THE PREFERRED EMBODIMENTS

Figure 1:
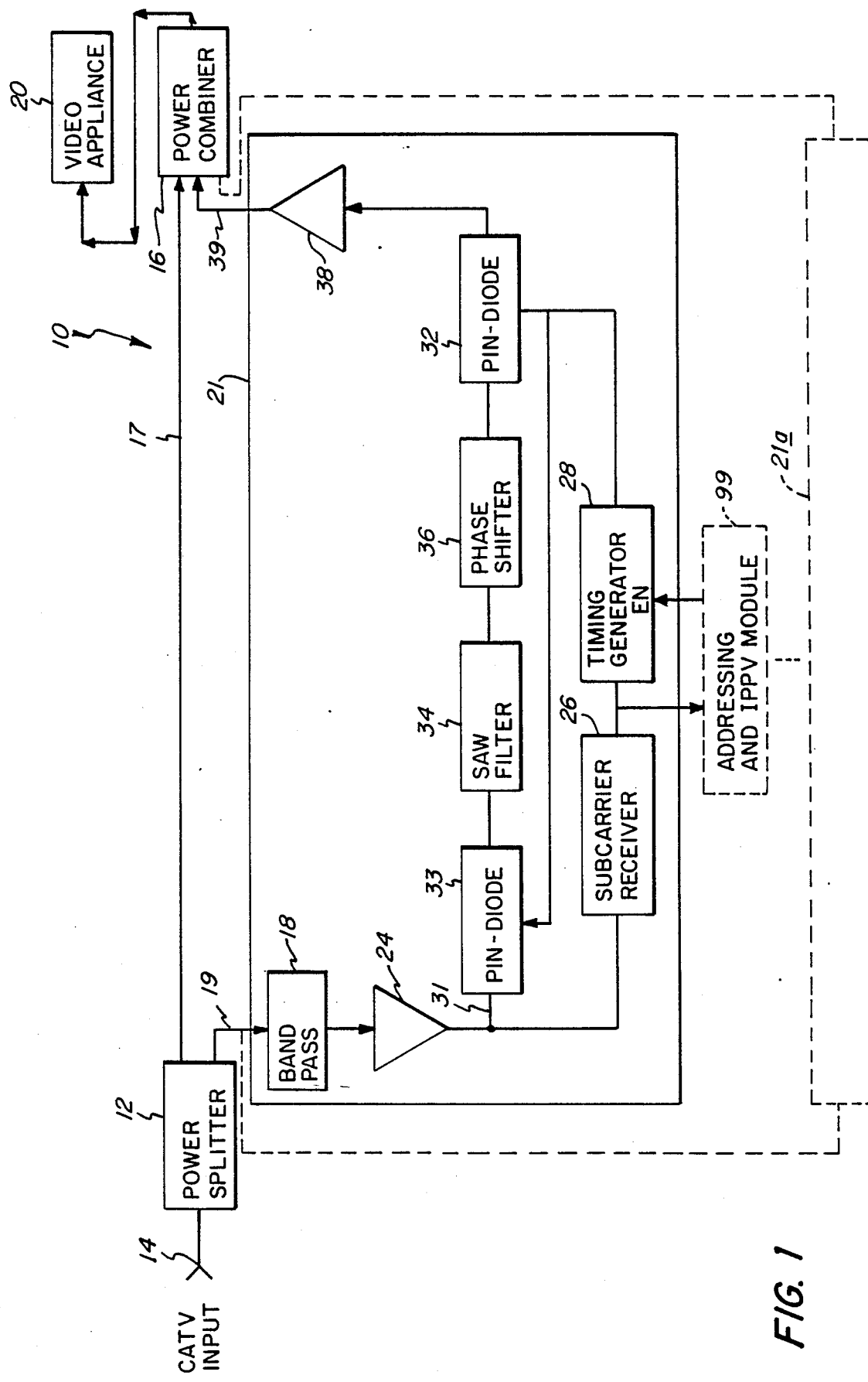
FIG. 1 is a simplified block diagram of a descrambler system according to the present invention.
Figure 2A:
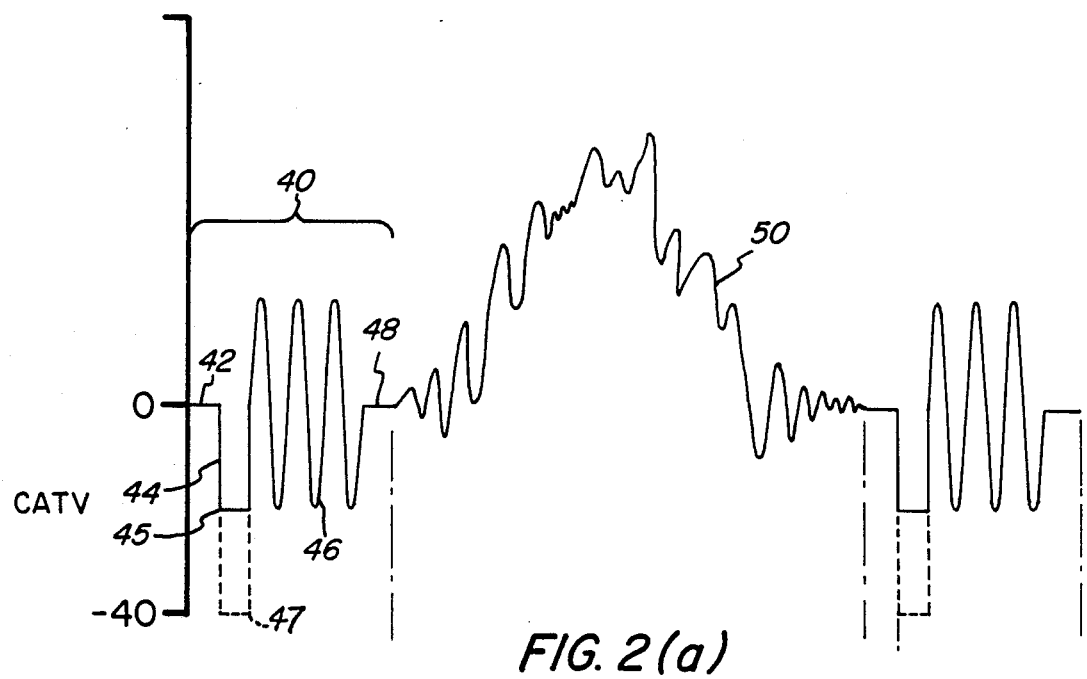
FIG. 2(a) is a graph illustrating one horizontal line of a scrambled video signal in which the amplitude of a horizontal synchronization pulse shown in solid line is attenuated or suppressed relative to a normal amplitude shown in broken line.

Referring now to the drawings in detail wherein like reference numerals indicate like elements throughout the drawings, FIG. 1 illustrates a descrambler system generally designated 10 in accordance with the present invention. As described in more detail below, system 10 is adapted to descramble a channel in which the amplitude of the amplitude modulated video carrier is attenuated by 6 db or more during the horizontal blanking interval. A CATV input signal 14 is so scrambled and is illustrated in FIG. 2(a). During horizontal blanking interval 40, a horizontal synchronization pulse 44 illustrated in solid line is attenuated by 6 db to level 45 relative to a normal unsuppressed level 47 illustrated in broken line. However, a color burst signal 46 is not attenuated. A video/audio signal 50 corresponding to one line of audio/video also is not attenuated or otherwise altered in this scrambling technique. At such level of the horizontal synchronization pulse, a standard television or other video appliance cannot lock onto the video/audio and therefore cannot adequately display the video and reproduce the audio. Both the pulse 44 and video portion of signal 50 are provided by an amplitude modulated video carrier.

Referring again to FIG. 1, system 10 includes a power splitter 12 which receives CATV input signal 14. Power splitter 12 provides an uneven split such that most of the power, for example, the CATV input signal minus 1 db, is transmitted to power combiner 16 via line 17, and the remainder of the power, for example, the CATV input signal minus approximately 6 db, is supplied to a bandpass filter 18 via line 19. As described in more detail below, the portion of the CATV signal passed to power combiner 16 via line 17 contains the scrambled and nonscrambled signal channels for transmission to a video appliance 20 without any degradation other than the negligible amount of degradation caused by power splitter 12 and power combiner 16. In contrast to the prior art, no bandpass filter is required between splitter 12 and combiner 16.

A descrambler unit 21 includes bandpass filter 18 which passes the scrambled channel only. The output of filter 18 is supplied to an input of a subcarrier receiver 26 via buffer amplifier 24.

Figure 2B:
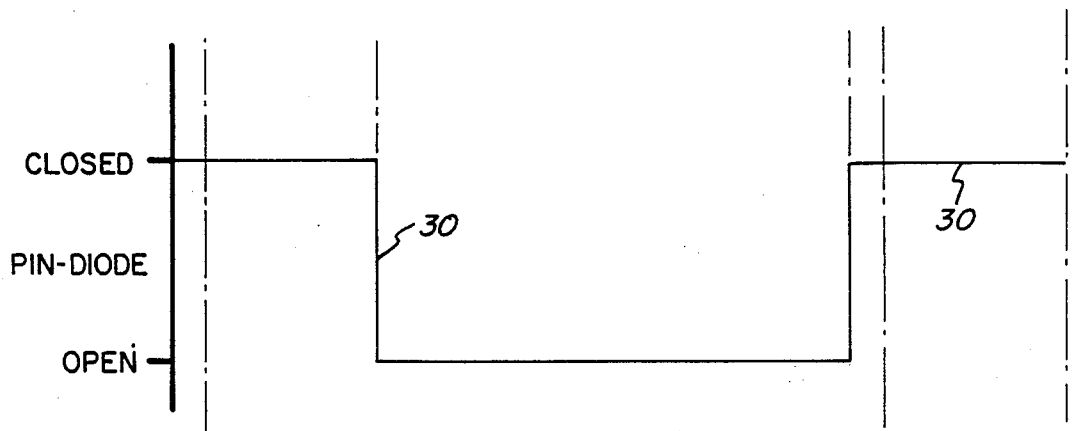
FIG. 2(b) is a graph illustrating the closure of a pin-diode within the descrambler system of FIG. 1 in synchronism with a horizontal blanking interval of the video signal of FIG. 2(a).

Subcarrier receiver 26 is tuned to an audio subcarrier contained within the scrambled channel, which audio subcarrier includes amplitude modulated timing information indicating the onset of each horizontal blanking interval. This timing information is supplied to a timing generator 28 which produces pulses 30 which coincide with the horizontal blanking intervals 40 as illustrated in FIG. 2(B). Each of the timing pulses 30 closes pin-diode or other switches 33 and 32. Pin-diode switch 33 receives the scrambled channel via line 31 and consequently passes the horizontal synchronism pulse and color burst occurring during the horizontal blanking interval. The output of pin-diode switch 33 is supplied to a surface acoustic wave (SAW) filter 34 which passes only the video carrier frequency of the scrambled channel. Thus, filter 34 passes the amplitude modulated horizontal synchronism pulse but blocks the color burst.

Figure 2C:
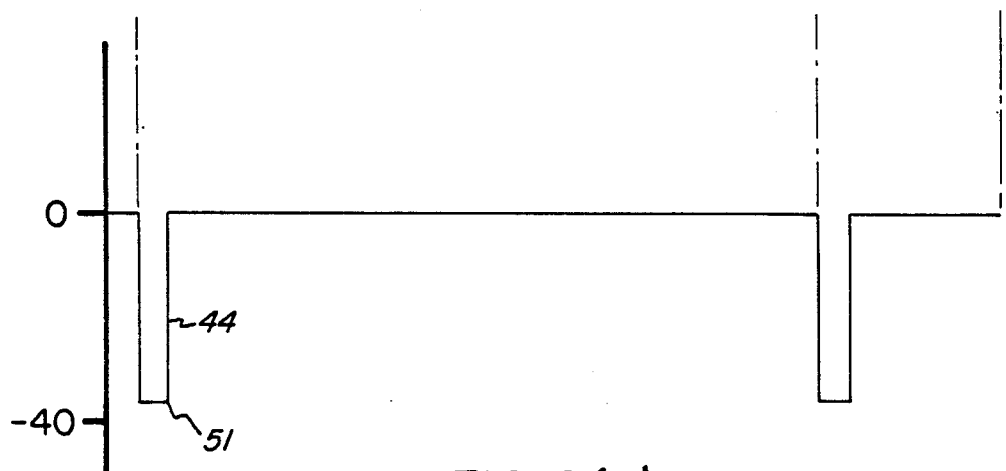
FIG. 2(c) is a graph illustrating an amplified horizontal synchronizing pulse synchronized with the horizontal synchronizing pulse of the scrambled signal of FIG. 2(a), which amplified horizontal synchronization pulse is generated by the descrambler system of FIG. 1 in the course of descrambling the scrambled channel.

SAW filter 34 as well as bandpass filter 18 introduce phase shifts to the horizontal synchronization pulse, and these phase shifts are offset by a phase shifter 36 connected to the output of SAW filter 34. Thus, the horizontal synchronization pulse at the output of phase shifter 36 is in phase with the horizontal synchronization pulse in the scrambled channel of the CATV input signal 14 on line 17. Because pin-diode switch 32 is closed in synchronism with the horizontal blanking interval 40, a "front porch" 42, horizontal synchronization pulse 44, and a "back porch" 48 are passed to an amplifier 38 en route to power combiner 16. Front and back porches 42 and 48 are at a zero level, and horizontal synchronization pulse 44 is amplified to a voltage level 51 illustrated in FIG. 2(c). Level 51 corresponds to the difference in power between the suppressed level 45 and the normal (unsuppressed) level 47. In power combiner 16, the amplified power of pulse 44 on line 39 is added to the suppressed power of pulse 44 on line 17. The full scale color burst signal 46 and video/audio signal 50 are also provided directly via power splitter 12 and line 17 to combiner 16. The gain of amplifier 38 as well as other amplifiers within descrambler unit 21 described in more detail below are adjusted such that the combined power of the suppressed and amplified pulses 44 total the normal power level found in an unscrambled channel such that the output of power combiner 16 is readily acceptable to video appliance 20.

It should be noted that in keeping with the objects of the invention, the nonscrambled channels are passed directly from power splitter 12 to power combiner 16 without degradation by any intervening components, and that the descrambler unit 21 only affects the scrambled channel. Also, the lack of a band reject filter in line 17 reduces the cost of descrambling system 10. Moreover, the descrambled and unscrambled channels are provided in one composite band at the output of combiner 16 so that a viewer can record any channel while viewing any channel.

System 10 also includes an optional, addressable impulse pay-per-view (IPPV) module 99 which allows a user upon payment of a separate cable television charge to activate or enable (EN) timing generator 28 within descrambler unit 21. IPPV module 99 utilizes the output of subcarrier receiver 26 to record the viewing channel.

Descrambler system 10 also optionally includes additional descrambler units 21a to descramble additional channels. As illustrated in FIG. 1, each descrambler unit 21a can utilize the same output of power splitter 12 (or a different output), and supplies a different input of power combiner 16 with a different unscrambled channel. In each of the additional descrambler units 21a, the associated bandpass filter 18 is also tuned to a different scrambled channel Otherwise, all of the descrambler units are identical to each other.

Figure 3:
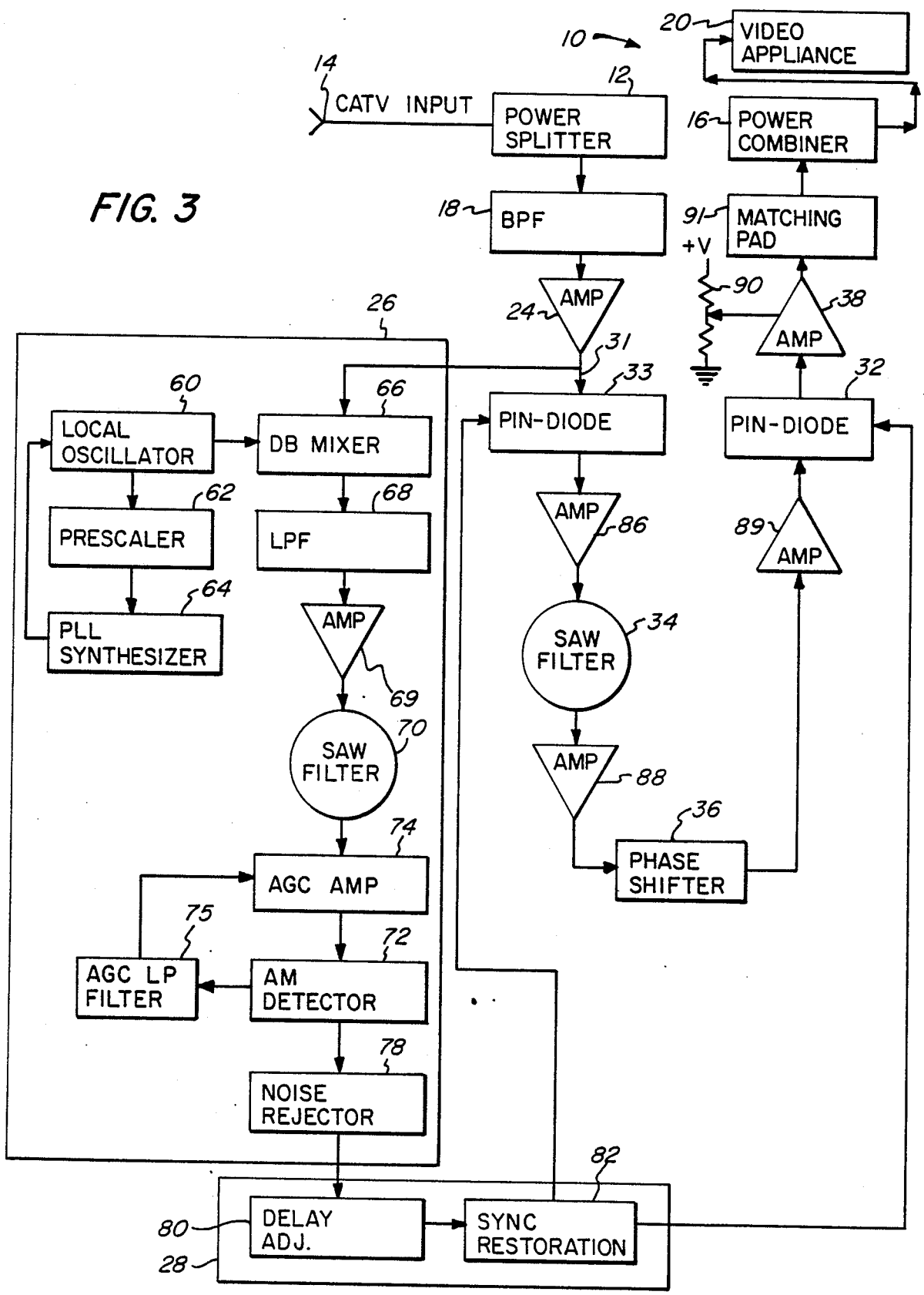
FIG. 3 is a more detailed block diagram of the descrambler components illustrated in solid line in FIG. 1.

Descrambler system 10 is illustrated in more detail in FIG. 3. Subcarrier receiver 26 comprises a local oscillator 60 whose frequency is controlled by a frequency dividing, prescaler 62 and a phase lock loop synthesizer 64. Prescaler 62 and synthesizer 64 control the frequency of the local oscillator to equal a frequency of the scrambled channel minus the SAW filter 70 frequency. The output of local oscillator 60 is supplied to a double balanced mixer 66, and the output of mixer 66 is passed through a low pass filter 68 to isolate the scrambled channel. The output of low pass filter 68 is supplied to a SAW filter 70 via buffer amplifier 69 which filter passes only the audio carrier. The output of filter 70 is supplied to an AM detector 72 via an automatic gain control (AGC) buffer amplifier 74, the gain of which amplifier is controlled by an AGC low pass filter 75 which filters one output of AM detector 72. A noise rejecter 78 filters the other output of AM detector 72 so that the output of audio subcarrier receiver 26 is a clean timing pulse pattern. This timing pulse indicates the onset of the horizontal blanking interval in the scrambled channel after phase shifts caused by filters 68, 70 and 78. A delay adjuster 80, such as a one-shot within timing generator 28, synchronizes the timing pulse produced by subcarrier receiver 26 with the onset of the horizontal blanking interval in the scrambled channel of the CATV signal on line 17. A synchronization restoration component 82, such as another one-shot, is triggered by the output of adjustor 80 and generates the timing pulses 30 in synchronization with the full duration of the horizontal blanking intervals 40.

As further illustrated in FIG. 3, an amplifier 86 buffers the output of pin-diode 33 en route to SAW filter 34, an amplifier 88 buffers the output of SAW filter 34, and amplifier 89 buffers the output of phase shifter 36. Also, a potentiometer 90 is used to control the gain of amplifier 38 as noted above, and a matching pad 91, such as a series resistor, matches the output impedance of amplifier 38 to the input impedance of power combiner 16.

Based on the foregoing, a descrambler system embodying the present invention has been disclosed. However, numerous modifications and substitutions may be made without deviating from the scope of the invention. For example, only one of the pin-diodes 33 or 32 is required to pass the horizontal blanking information while blocking the video signal. Therefore, the invention has been disclosed by way of illustration and not limitation, and reference should be made to the following claims to determine the scope of the invention.

I claim:

1. A system for descrambling a scrambled channel in a TV signal which scrambled channel has a suppressed horizontal synchronization pulse and which TV signal also includes nonscrambled channels, said system comprising:

signal splitter means having an input to receive said TV signal, and first and second outputs, for splitting said TV signal into first and second signals which are provided at said first and second outputs, respectively, each of said first and second signals simultaneously containing said scrambled channel and said nonscrambled channels;

switch means coupled to said second output of said signal splitter means, for receiving said scrambled channel in said second signal, passing a horizontal synchronization pulse of said scrambled channel in said second signal and blocking a video signal of said scrambled channel in said second signal;

means for synchronizing said horizontal synchronization pulse passed through said switch means with a horizontal synchronization pulse of said scrambled channel in said first signal; and combiner means having a first input coupled to said first output of said signal splitter means to receive said nonscrambled and scrambled channels in said first signal, and a second input coupled to receive the synchronized horizontal synchronization pulse passed through said switch means, for combining said first signal with the horizontal synchronization pulse passed through said switch means, and having an output to transmit the combined signal to a video appliance.

2. A system as set forth in claim 1 further comprising a bandpass filter tuned approximately to said scrambled channel and interposed between said second output of said signal splitter means and said switch means.

3. A system as set forth in claim 1 wherein said switch means is closed during an entire horizontal blanking interval of said scrambled channel in said second signal.

4. A system as set forth in claim 1 further comprising:

means for amplifying said horizontal synchronization pulse of said scrambled channel in said second signal such that when said horizontal synchronization pulse of said scrambled channel in said second signal is combined in said combiner means with said horizontal synchronization pulse in said scrambled channel in said first signal, the combined power of said horizontal synchronization pulses is approximately equal to an unsuppressed level, whereby said scrambled channel is descrambled.

5. A system as set forth in claim 1 wherein the switch means comprises means for detecting timing information in an audio carrier of said TV signal, which timing information indicates the timing of said horizontal synchronization pulse and controls the opening and closing of said switch means.

6. A system as set forth in claim 2 further comprising a second filter tuned to a video carrier within said scrambled channel in said second signal, said second filter being interposed between said second output of said power splitter means and said second input of said combiner means in series with said bandpass filter and said switch means.

7. A system as set forth in claim 1 wherein said signal splitter means produces said first signal with greater power than said second signal.

8. A system as set forth in claim 1 wherein the synchronizing means comprises a phase shifter to provide said horizontal synchronization pulse of said scrambled channel in said second signal in synchronization with said horizontal synchronization pulse of said scrambled channel in said first signal.

9. A system as set forth in claim 8 further comprising a bandpass filter tuned approximately to said scrambled channel, said bandpass filter being connected in series with said switch means and said phase shifter.

10. A system as set forth in claim 1 wherein said first output of said power splitter means is connected directly to said first input of said combiner means.

11. A system for descrambling a scrambled channel in a television signal which television signal also includes nonscrambled channels and which scrambled channel has an attenuated horizontal synchronization pulse, said system comprising:

signal splitter means, having an input to receive said TV signal, and first and second outputs, for splitting said TV signal into first and second signals which are provided at said first and second outputs, respectively, each of said first and second signals simultaneously containing said scrambled channel and said nonscrambled channels and having substantially identical frequency characteristics;

a bandpass filter coupled to said second output of said signal splitter means and tuned approximately to said scrambled channel;

timing means coupled to an output of said bandpass filter for providing horizontal synchronization pulses in said second signal in synchronization with horizontal synchronization pulses of said scrambled channel in said first signal; and combiner means having a first input coupled to said first output of said signal splitter means to receive said nonscrambled and scrambled channels in said first signal, and a second input coupled to receive said horizontal synchronization pulses provided by said timing means, for combining said horizontal synchronization pulses provided by said timing means with said scrambled channel in said first signal, and having an output to transmit the combined signal to a video appliance.

12. A system as set forth in claim 11 wherein the timing means comprises a phase shifter connected in series with said bandpass filter between said second output of said power splitter means and said second input of said combiner means.

13. A system as set forth in claim 11 wherein said first output of said power splitter means is connected directly to said first input of said combiner means.

14. A system as set forth in claim 11 wherein the combined power of said horizontal synchronization pulses provided at said first and second inputs of said combiner means corresponds to that of an unscrambled horizontal synchronization pulse.

* * * * *